(12) United States Patent
Laermer et al.

(10) Patent No.: US 6,360,604 B1
(45) Date of Patent: Mar. 26, 2002

(54) ACCELERATION SENSOR

(75) Inventors: Franz Laermer, Stuttgart; Bernhard Elsner, Kornwestheim; Wilhelm Frey, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,532
(22) PCT Filed: Apr. 16, 1998
(86) PCT No.: PCT/DE98/01068
 § 371 Date: Nov. 9, 1999
 § 102(e) Date: Nov. 9, 1999
(87) PCT Pub. No.: WO98/52051
 PCT Pub. Date: Nov. 19, 1998

(30) Foreign Application Priority Data

May 10, 1997 (DE) .......................................... 197 19 779

(51) Int. Cl.$^7$ ................................................ G01P 15/00
(52) U.S. Cl. .................................................. 73/514.38
(58) Field of Search ........................ 73/514.32, 514.38, 73/514.16, 514.01

(56) References Cited

U.S. PATENT DOCUMENTS

| | | | | |
|---|---|---|---|---|
| 5,345,824 A | * | 9/1994 | Sherman et al. | 73/514.32 |
| 5,417,111 A | * | 5/1995 | Sherman et al. | 73/514.32 |
| 5,495,761 A | * | 3/1996 | Diem et al. | 73/514.32 |
| 5,565,625 A | * | 10/1996 | Howe et al. | 73/514.16 |
| 5,631,422 A | * | 5/1997 | Sulzberger et al. | 73/514.32 |
| 5,646,347 A | * | 7/1997 | Weiblen et al. | 73/514.32 |
| 5,756,901 A | * | 5/1998 | Kurle et al. | 73/777 |
| 5,920,012 A | * | 7/1999 | Pinson | 73/504.12 |
| 5,992,233 A | * | 11/1999 | Clark | 73/514.35 |

FOREIGN PATENT DOCUMENTS

| | | |
|---|---|---|
| DE | 44 31 478 | 3/1996 |
| DE | 195 03 236 | 8/1996 |

* cited by examiner

Primary Examiner—Richard A. Moller
(74) Attorney, Agent, or Firm—Kenyon & Kenyon

(57) ABSTRACT

An acceleration sensor has an oscillating structure which is movably suspended on a substrate and can be deflected by an acting acceleration. The acceleration sensor also has an analyzing arrangement detecting a deflection of the oscillating structure due to the acceleration. The oscillating structure and/or the analyzing arrangement are connected to the substrate by mechanical decoupling devices.

24 Claims, 3 Drawing Sheets

ACCELERATION SENSOR

BACKGROUND INFORMATION

Conventional acceleration sensors generally have an oscillating structure as a seismic mass suspended movably on a substrate. This seismic mass is deflected by an acceleration acting on it and changes its position relative to the substrate. Analyzing means are provided for the seismic mass to detect the degree of deflection due to acceleration. Known analyzing means include piezoresistive, capacitive and frequency-analog analyzing arrangements, for example. With capacitive analyzing means, the seismic mass is provided with a comb structure that works together with a stationary (i.e., attached to the substrate) comb structure. Capacitances that vary in size with deflection of the seismic mass develop between the individual webs of the comb structures. These changes in capacitance can be detected by analyzing circuits, and thus an acceleration acting on the acceleration sensor can be detected.

One disadvantage of the known acceleration sensors is that there may be fluctuations in the length of the substrate or the sensor structures depending on temperature or mechanical stresses, for example, causing minor variations in the positions of the seismic mass suspended on the substrate or in the analyzing means, subsequently causing a change in the signal. These signal changes lead to faulty detection of an acting acceleration or they are superimposed on a signal of the analyzing means which is proportional to an acting acceleration with an offset error.

SUMMARY OF THE INVENTION

The acceleration sensor according to the present invention is advantageous in that fluctuations dependent on temperature or mechanical stresses occurring in the substrate or sensor structures can be compensated. Due to the fact that the oscillating structure and/or analyzing arrangement are connected to the substrate by mechanical decoupling devices, it is advantageously possible to compensate for any material effects in the substrate or sensor structures caused by compression and/or tensile stresses as well as fluctuations in temperature, so that they have no effect on the acceleration sensor, in particular its sensitivity. In addition, differences in material between the substrate and the sensor can be compensated with the mechanical decoupling devices, e.g. with acceleration sensors applied to a wafer by additive methods of surface micromechanics. Thus, for example, differences in the thermal expansion properties of silicon and metallic materials such as those used in some additive techniques can be compensated.

DETAILED DESCRIPTION

Figure 1:
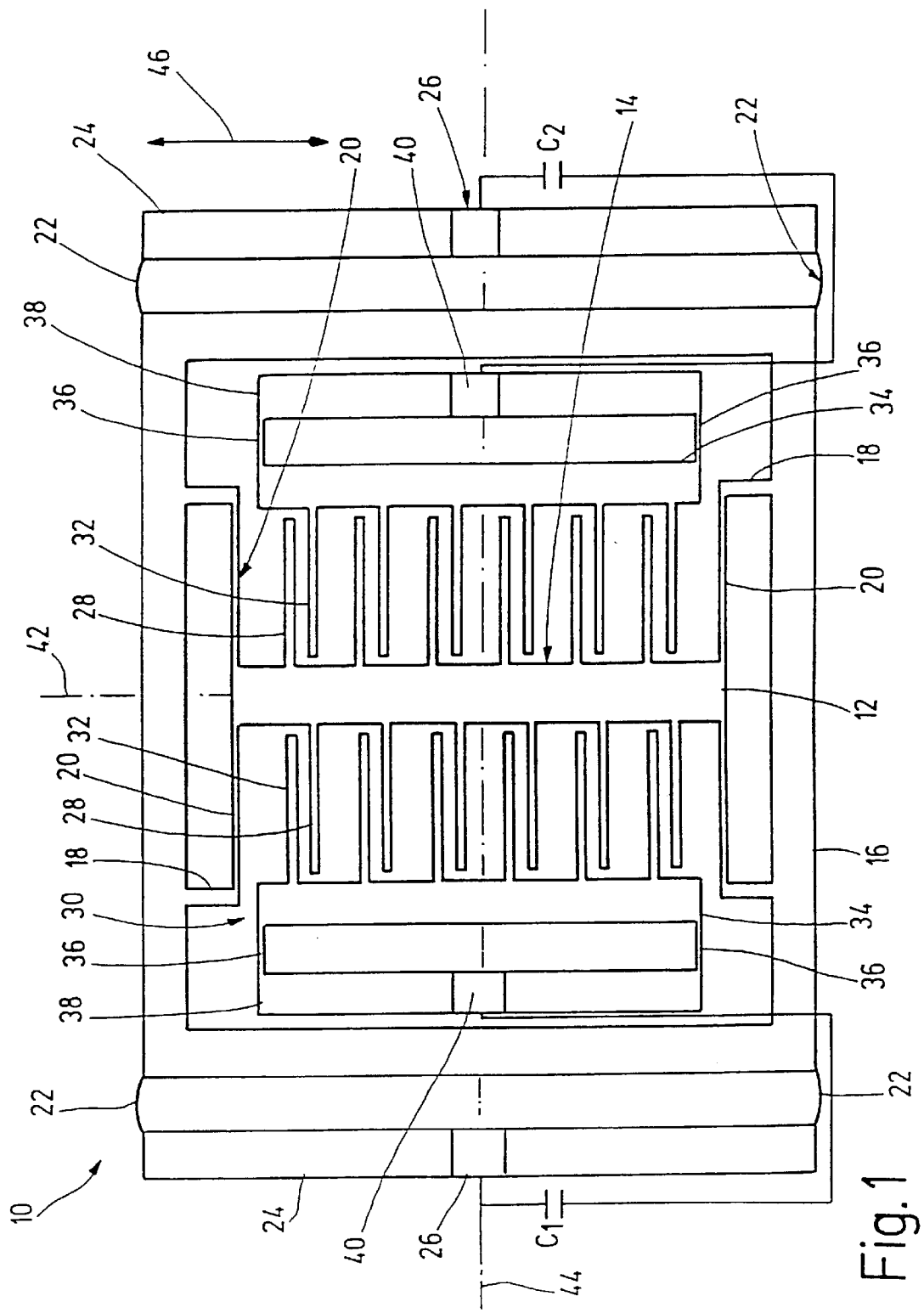
FIG. 1 shows a top view of a first embodiment of an acceleration sensor according to of the present invention.

FIG. 1 shows a top view of the design of an acceleration sensor 10. Acceleration sensor 10 is structured on a substrate, such as a wafer (not shown in detail). The structuring can be accomplished by known methods of surface micromechanics. In FIG. 1, the wafer is formed by the plane of the paper. The wafer may at the same time have electric analyzing circuits, not described in detail here, for acceleration sensor 10.

Acceleration sensor 10 has an oscillating structure 12 designed as a seismic mass 14. Oscillating structure 12 is suspended movably with respect to the substrate (wafer). A frame 16 is provided for this purpose, with projections 18 extending inward from it. Projections 18 are connected to one another by spring bars 20, with seismic mass 14 being arranged between opposing spring bars 20. As seen in a top view, spring bars 20 have a small width, and as seen into the plane of the paper, they have a relatively great depth. Frame 16 is connected to holding webs 24 by decoupling webs 22. Decoupling webs 22 also have a relatively small width as seen in a top view and a relatively great depth as seen into the plane of the paper. Holding webs 24 are attached to the substrate (wafer) by central anchoring points 26. These relatively small fastening points 26 support the entire arrangement of holding webs 24, frame 16, oscillating structure 12 and spring webs 20 or decoupling webs 22, and this arrangement being arranged over the substrate but otherwise floating freely. This can be accomplished by known process steps in the production of surface micromechanical structures, with undercutting below the freely vibrating areas, so that there is a slight gap between the substrate and the arrangement.

Seismic mass 14 has a comb structure 28 formed by lamellae arranged perpendicular to the surface of the wafer on both sides. Comb structures 28 are relatively rigid, so that with any movement of seismic mass 14, they vibrate rigidly with seismic mass 14.

Acceleration sensor 10 also has analyzing means 30 (e.g., an analyzing arrangement) in the form of stationary comb structures 32. Comb structures 32 project from a holding bar 34 connected to a holding web 38 by decoupling webs 36. Holding web 38 is connected by an anchoring point 40 to the substrate (wafer). Here again, only holding web 38 is connected to the substrate in the area of anchoring points 40, so the other areas of holding web 30, decoupling webs 36, holding bars 34 and comb structures 32 are cantilevered, i.e., they have no direct point of contact with the substrate.

Comb structures 28 and 32 of seismic mass 14 and/or analyzing means 30 mesh with one another, forming a capacitive analyzing means in a known way. Due to the arrangement of comb structures 32 and 28, capacitances C develop between adjacent webs of comb structures 28 and 32, i.e., a capacitance C1 at the left and a capacitance C2 at the right in the top view shown in FIG. 1. These capacitances are determined by the distance between the webs of comb structures 28 and 32 and by the opposing surfaces of the webs of comb structures 28 and 32. The entire acceleration sensor 10 is an electrically conducting material such as silicon, so the capacitances can be linked to the substrate and thus to an analyzing circuit (not shown in detail) by anchoring points 26 and 40.

Acceleration sensor 10 has decoupling webs 22 and anchoring points 26 and 40 that are arranged symmetrically with an imaginary center line 42 passing through seismic mass 14. Comb structures 28 and 32 are arranged in mirror image symmetrically to one another. Anchoring points 26 and 40 all lie on one imaginary line 44. This line 44 is parallel to comb structures 28, 32. As a result, the distance between the individual elements remains the same when the comb structures are stretched, and therefore the capacitance between the comb structures remains essentially unchanged. This further reduces the dependence on temperature, because the structure can expand or contract freely in the direction perpendicular to this line 44, so that no thermal stresses can be induced. Thermal stresses along this line are also relaxed in conjunction with the decoupling elements. Expansion of the material perpendicular to this line takes place symmetrically with it, namely identically for the suspended mass with its movable comb structures and its comb structures fixed in stationary mount on this line, together forming the analyzing means of the sensor element. Since both "stationary" and "movable" comb structures can expand or relax identically perpendicular to this line, the gap spacings of the analyzing means change only by $\sim\Delta T\epsilon_{sensor\ material}$, which is relatively minor. Otherwise, in an extreme case the gap width would change by $\sim\Delta T \cdot (\epsilon_{sensor\ material} - \epsilon_{substrate}) \cdot l$, in the case of a comb attached completely to the stationary mount (substrate), with l being the lateral extent of the comb expansion.

Acceleration sensor 10 shown in FIG. 1 carries out the following functions:

Seismic mass 14 is deflected according to an acceleration acting on acceleration sensor 10 as indicated by double arrow 46. Due to the design of spring bars 20, deflection is permitted only in the direction of the possible accelerations according to double arrow 46, because of the soft suspension of seismic mass 14 in this direction by spring bars 20 and the rigid suspension in the direction perpendicular to that. Due to the deflection of seismic mass 14, the distances between the webs of comb structures 28 and 32 change, resulting in a corresponding change in capacitances C1 and C2. When seismic mass 14 is deflected upward, the distance between the webs of comb structures 28 and 32 on the left side of the seismic mass is reduced, while the distance between the webs of comb structures 28 and 32 on the right side of seismic mass 14 is increased accordingly. Similarly, capacitances C1 and C2, which can be detected by a corresponding analyzing circuit and supply a signal corresponding to acting acceleration 46 are decreased and increased, respectively. This signal can be used, for example, to deploy restraint systems in motor vehicles.

The arrangement of decoupling webs 22 and the arrangement of anchoring points 26 and 40 on line 44 yield the result that stresses within the substrate which depend on the temperature and/or material and are independent of the action of acceleration 46 are not transmitted to seismic mass 14 or to analyzing means 30 but instead can be relaxed freely. The mechanical stresses and/or temperature-dependent expansions occurring in the substrate are compensated by decoupling webs 22, so they cannot be transmitted to frame 16 and seismic masses 14 arranged in it. Decoupling webs 22 are soft and flexible in the plane of the substrate, so that, for example, a change in the length of the material which is transmitted to holding webs 24 can be compensated. This is achieved because decoupling webs 22 are relatively narrow as seen in the view from above, and they have a relatively great depth as seen into the plane. Therefore, decoupling webs 42 have a relatively soft suspension in the direction of center line 42. Due to the arc-shaped geometry of decoupling webs 22 between frame 16 and holding webs 24, changes in length occurring in the direction of line 44 can also be compensated. Due to the great depth relative to the width of decoupling webs 22, deflections perpendicular to the plane of the substrate (perpendicular to the plane of the paper in FIG. 1) are compensated, because decoupling webs 22 are rigid in this direction. Due to the symmetrical arrangement of decoupling webs 22 and anchoring points 26 and 40, mechanical stresses that occur are compensated uniformly and with the opposite sign, so that seismic mass 14 and analyzing means 30 remain in their positions.

A change in the length of the structure of acceleration sensor 10 itself, for example, spring bars 20 and/or frame 16 and/or seismic mass 14 with a change in temperature, where the change in length results from the coefficient of linear expansion of the respective material, is compensated by decoupling webs 22 and the arrangement of anchoring points 26 and 40 in a line. This does not result in any change in position of seismic mass 14 relative to analyzing means 30.

Figure 2:
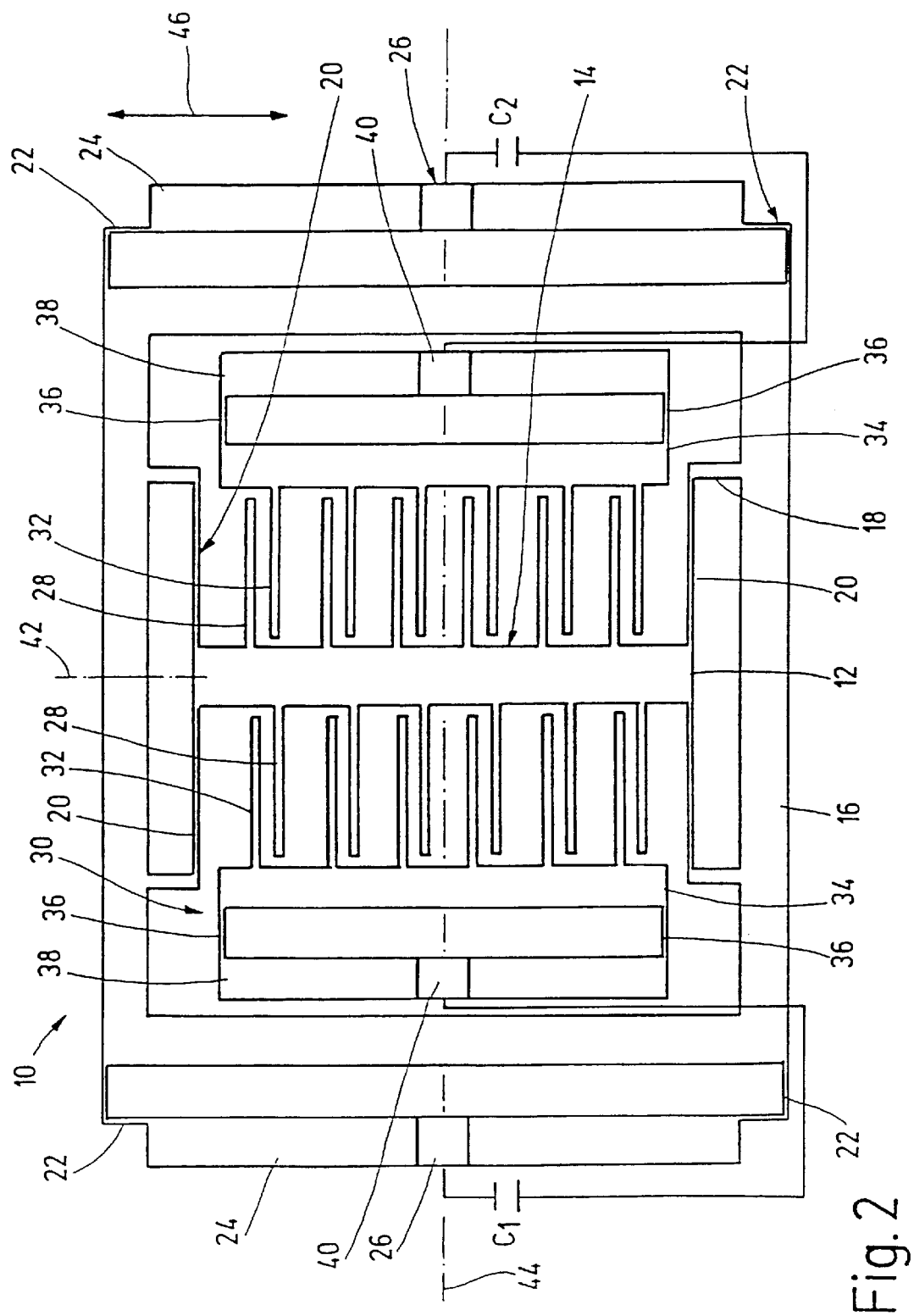
FIG. 2 shows a top view of a second embodiment of the acceleration sensor according to the present invention.

FIG. 2 shows another embodiment of an acceleration sensor 10. The same parts as in FIG. 1 are labeled with the same reference notation and will not be explained again. In the embodiment in FIG. 2, decoupling webs 22 are designed as angles. This also achieves the result that decoupling webs 22 are soft in the direction of center line 42 and in the direction of line 44, and they are stiff in the direction into the plane of the paper due to their relatively great depth in relation to their width as seen in a top view. Thus, changes in length occurring here in the substrate or in acceleration sensor 10 due to changes in temperature or mechanical stresses can also be compensated. The angular design of decoupling webs 22 can be achieved more easily with known methods of structuring structures by surface micromechanics than the curved structure of decoupling webs 22 shown in FIG. 1. The effect of decoupling webs 22 is the same in both cases.

Figure 3:
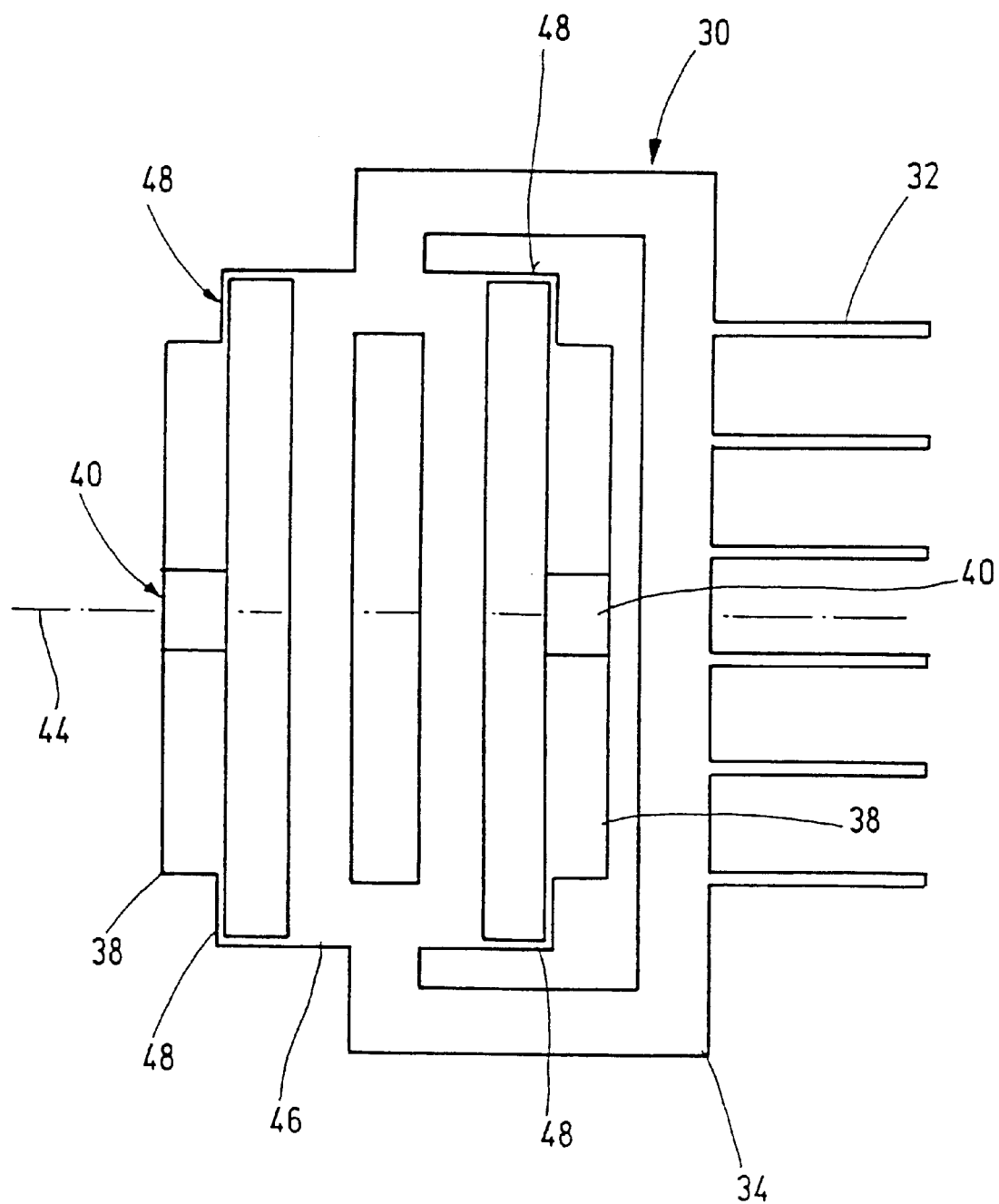
FIG. 3 shows a top view of an analyzing arrangement of the acceleration sensor.

FIG. 3 shows a detailed view of one exemplary embodiment of the design of analyzing means 30. Holding bar 34 is attached to holding webs 38 by a frame 46 and decoupling webs 48. Holding webs 38 in turn are attached to the substrate by anchoring points 40.

In addition, decoupling of analyzing means 30 from changes in length of the substrate or of the analyzing means 30 itself is also achieved with the embodiment illustrated in FIG. 3. In FIG. 3, improved decoupling of analyzing means 30 from changes in length due to temperature and mechanical stresses in the material of the substrate is achieved through the symmetrical arrangement of decoupling webs 48 and the arrangement of anchoring points 40 on line 44. Decoupling webs 48 are in turn designed with an angular shape, so they are soft in the direction of line 44 and center line 42 (see FIG. 1) and they are rigid perpendicular to the substrate.

On the whole, complete compensation of temperature and stresses is possible with decoupling webs 22 and 48 and the arrangement of anchoring points 26 and 40 on one line, so that any compressive and tensile stresses in the sensor material, i.e., in the substrate or in acceleration sensor 10 itself, can be compensated and thus have no effect on the sensor response, in particular an offset and a sensitivity.

What is claimed is:

1. An acceleration sensor, comprising:
   an oscillating structure which is arranged on a substrate in a movably suspended manner, the oscillating structure capable of being deflected by an acting acceleration;
   at least one mechanical decoupling device;
   an analyzing arrangement detecting a deflection of the oscillating structure due to the acting acceleration, wherein at least one of the oscillating structure and the analyzing arrangement is connected to the substrate by the at least one mechanical decoupling device;
   decoupling webs; and
   holding webs attached to the substrate;
   wherein:
      the at least one mechanical decoupling device includes a frame connected to the holding webs via the decoupling webs; and the oscillating structure is arranged in a suspension mount in the frame.

2. The acceleration sensor according to claim 1, wherein the analyzing arrangement is connected by the decoupling webs to at least one of the holding webs.

3. The acceleration sensor according to claim 2, wherein the decoupling webs have an angled shape between the analyzing arrangement and the at least one of the holding webs.

4. The acceleration sensor according to claim 2, wherein each of the at least one of the holding webs is connected to the substrate via a symmetrically-arranged anchoring point.

5. The acceleration sensor according to claim 2, wherein the decoupling webs are soft in a first direction of motion which is parallel to a surface of the substrate, and wherein the decoupling webs are rigid in a second direction of motion which is perpendicular to the surface of the substrate.

6. The acceleration sensor according to claim 4, wherein the anchoring point is located on an imaginary line extending along the substrate.

7. The acceleration sensor according to claim 6, further comprising:
comb structures composed of elongated plate-shaped webs, the comb structures being arranged parallel to one another, wherein the imaginary line extends parallel to the elongated plate-shaped webs.

8. The acceleration sensor according to claim 1, wherein each of the holding webs is connected to the substrate at a symmetrically-arranged anchoring point.

9. The acceleration sensor according to claim 8, wherein the anchoring point is located on an imaginary line extending along the substrate.

10. The acceleration sensor according to claim 9, further comprising:
comb structures composed of elongated plate-shaped webs, the comb structures being arranged parallel to one another, wherein the imaginary line extends parallel to the elongated plate-shaped webs.

11. The acceleration sensor according to claim 1, wherein the decoupling webs have an arc shape between the frame and the holding webs.

12. The acceleration sensor according to claim 1, wherein the decoupling webs have an angled shape between the frame and the holding webs.

13. The acceleration sensor according to claim 1, wherein the decoupling webs include four symmetrically-arranged decoupling webs, and wherein the frame is connected to the holding webs by the four decoupling webs.

14. The acceleration sensor according to claim 1, wherein the oscillating structure is connected to the substrate by the at least one mechanical decoupling device.

15. The acceleration sensor according to claim 1, wherein the analyzing arrangement is connected to the substrate by the at least one mechanical decoupling device.

16. An acceleration sensor, comprising:
an oscillating structure which is arranged on a substrate in a movably suspended manner, the oscillating structure capable of being deflected by an acting acceleration;
at least one mechanical decoupling device;
an analyzing arrangement detecting a deflection of the oscillating structure due to the acting acceleration, wherein the oscillating structure and the analyzing arrangement are connected to the substrate by the at least one mechanical decoupling device;
decoupling webs; and
holding webs attached to the substrate,
wherein the at least one mechanical decoupling device includes a frame which is connected to the holding webs via the decoupling webs, and
wherein the oscillating structure is arranged in a suspension mount in the frame.

17. The acceleration sensor according to claim 16, wherein each of the holding webs is connected to the substrate at a symmetrically-arranged anchoring point.

18. The acceleration sensor according to claim 17, wherein the anchoring point is located on an imaginary line extending along the substrate.

19. The acceleration sensor according to claim 18, further comprising:
comb structures composed of elongated plate-shaped webs, the comb structures being arranged parallel to one another, wherein the imaginary line extends parallel to the elongated plate-shaped webs.

20. The acceleration sensor according to claim 16, wherein the decoupling webs have an arc shape between the frame and the holding webs.

21. The acceleration sensor according to claim 16, wherein the decoupling webs have an angled shape between the frame and the holding webs.

22. The acceleration sensor according to claim 16, wherein the decoupling webs include four symmetrically-arranged decoupling webs, and wherein the frame is connected to the holding webs by the four decoupling webs.

23. An acceleration sensor, comprising:
an oscillating structure which is arranged on a substrate in a movably suspended manner, the oscillating structure capable of being deflected by an acting acceleration;
at least one mechanical decoupling device;
an analyzing arrangement detecting a deflection of the oscillating structure due to the acting acceleration, wherein the oscillating structure and the analyzing arrangement are connected to the substrate by the at least one mechanical decoupling device;
decoupling webs; and
at least one holding web attached to the substrate, wherein the analyzing arrangement is connected by the decoupling webs to the at least one holding web;
wherein the at least one mechanical decoupling device includes a frame which is connected to the at least one holding web via the decoupling webs, and wherein the analyzing arrangement is connected to the frame.

24. The acceleration sensor according to claim 23, wherein the decoupling webs include four symmetrically arranged decoupling webs, and wherein the frame is connected to the at least one holding web by the four symmetrically arranged decoupling webs.

* * * * *